H. P. GAGE & E. PASCUCCI.

REFRACTING COVER GLASS FOR AUTOMOBILE HEADLIGHTS.

APPLICATION FILED APR. 15, 1918.

Reissued Sept. 17, 1918.

14,521.

2 SHEETS—SHEET 1.

Inventors

Henry Phelps Gage,
and Emilio Pascucci

By Frederic Cole

Attorney

H. P. GAGE & E. PASCUCCI.

REFRACTING COVER GLASS FOR AUTOMOBILE HEADLIGHTS.

APPLICATION FILED APR. 15, 1918.

Reissued Sept. 17, 1918. 14,521.

2 SHEETS—SHEET 2.

Inventors
Henry Phelps Gage,
and Emilio Pascucci

By D. Meyer Cole
Attorney

UNITED STATES PATENT OFFICE.

HENRY PHELPS GAGE AND EMILIO PASCUCCI, OF CORNING, NEW YORK, ASSIGNORS TO CORNING GLASS WORKS, OF CORNING, NEW YORK, A CORPORATION OF NEW YORK.

REFRACTING COVER-GLASS FOR AUTOMOBILE-HEADLIGHTS.

14,521. Specification of Reissued Letters Patent. Reissued Sept. 17, 1918.

Original No. 1,243,399, dated October 16, 1917, Serial No. 136,434, filed December 12, 1916. Application for reissue filed April 15, 1918. Serial No. 228,790.

*To all whom it may concern:*

Be it known that we, HENRY PHELPS GAGE and EMILIO PASCUCCI, citizens of the United States of America, and residents of the city of Corning and State of New York, have invented certain new and useful Improvements in Refracting Cover-Glasses for Automobile-Headlights, of which the following is a specification.

Our invention has for its object to provide a construction in automobile headlights which will more fully meet the requirements than glasses now in use.

It is well known that with automobile headlights the problem presented is to illuminate the road a sufficient distance in front of the machine without at the same time producing blinding glare in the eyes of any approaching driver. For this purpose we propose to place on the cover glass a plurality of refracting ribs whereby part of all of the light thrown forward by the reflector will be bent and diffused in definite desirable directions.

We prefer to form the diffusing ribs cylindrical and with axes inclined to the opposite face of the cover-glass, so that such ribs not only give side diffusion of light projected thereby but deflect the light downwardly by an amount depending on the inclination of their axes to the opposite face of the glass. Furthermore, this is advantageous in that side light is usually demanded immediately in front of the vehicle, in order that the user of the headlight may be enabled to see the entire width of the road and especially the ditches to the side of the road.

In the form of the invention first to be described, the inner face of the cover glass has formed thereon a plurality of horizontal rows of vertical ribs, each rib being in the form of a cylindrical ungula, the axis of which is at an angle to the face on which the ungula is placed (as well as at an angle to the opposite face), thus leaving plane cusped shaped portions in each row between the several ribs thereon.

In this form of cover glass the light which passes through without diffusion does not pass through as a single beam, but in the form of a number of rays, the points at which such rays pass through the cover-glass being separated by the interposed diffusing ribs, so that the cover-glass, as it were, instead of permitting the passage of a uniform bundle permits the passage of a plurality of such bundles, each being relatively small, whereby the glare is reduced.

In another form of cover-glass to be described, the diffusing ribs are cylindrical ungulas whose axes are parallel with the face on which they are placed, the edges of the ungulas being in contact with each other, so that in this form, no light is allowed to pass between the ribs.

Both the first and second forms of cover-glass here described, are part of one invention which consists in a means of producing downward deflection combined with side diffusion by means of diffusing ribs. As stated, in forms of cover-glass, we prefer to form the diffusing ribs cylindrical, and with axes inclined to the optic axis of the system (which in practice may be considered horizontal), of which the glass is to be a part, or more specifically, with axes inclined to the opposite face of the cover-glass, so that such ribs not only give side diffusion of light projected thereby by an amount depending upon the angle subtended between the tangents to the surface of the diffusing ribs at their extreme edges, but they also deflect the light passing therethrough downward by an amount depending upon the inclination of their axes to the opposite face of the cover-glass.

In either form the ribs may cover all or a part of one surface of the glass. If the latter construction be adopted, the ribs are by preference placed upon the central portion of the glass, and in the path of the rays projected forwardly directly from the lens. The former construction is advantageous under certain conditions, however, in that all of the light projected forward by the reflector is deflected downward, thereby eliminating the possibility of glare in the eyes of drivers approaching the headlight.

Our invention further consists in the several features thereof as will be hereinafter more fully described.

Referring to the accompanying drawings in which corresponding parts are designated by corresponding marks of reference,—

Figure 1:
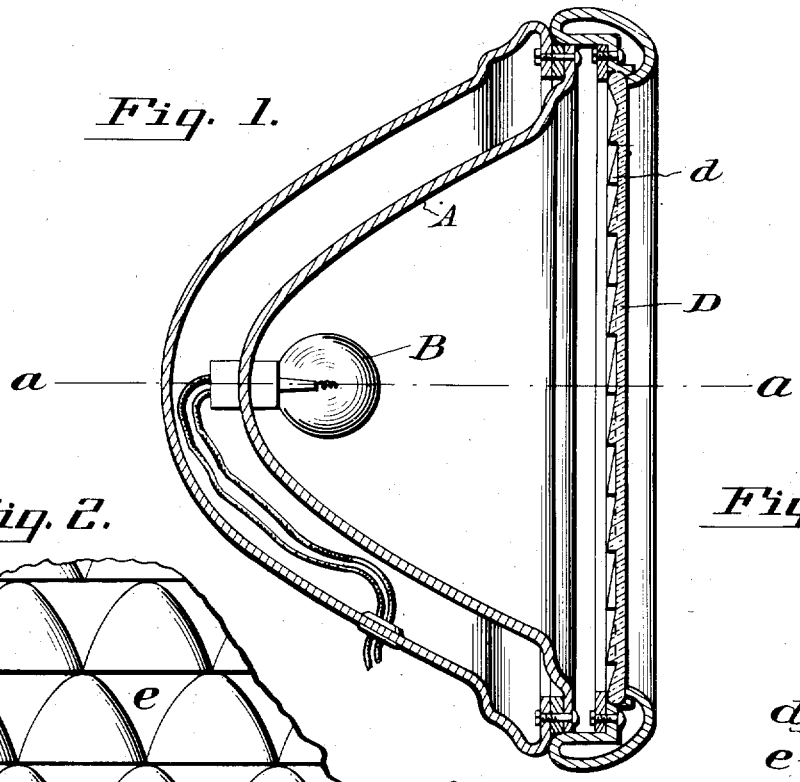
Figure 1 is a section through a headlight having one form of our invention applied thereto.
Figure 2:
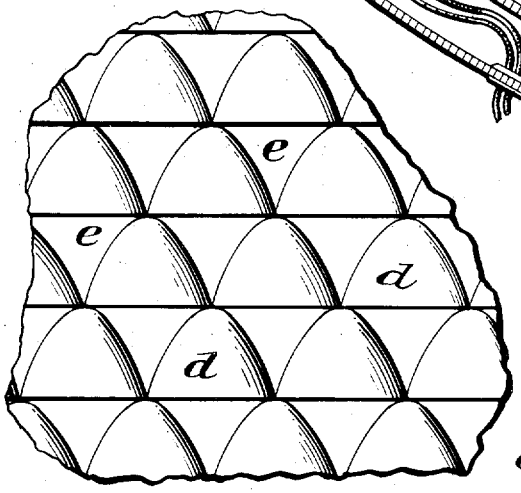
Fig. 2 is a fragmental rear view of the cover-glass shown therein, and forming subject-matter of this invention.
Figure 4:
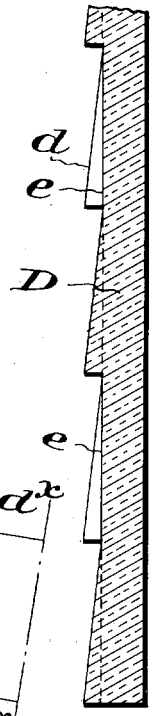
Fig. 4 is a vertical section through the glass shown in Fig. 2.

In these drawings the headlight may be of any approved construction, and is shown as consisting of a lamp B properly located in respect to the reflector A to project a more or less parallel beam.

In front of the reflector is located the cover-glass D through which passes the light thrown forwardly by the reflector. In practice, when the bulb is in the focus of the parabolic reflector, the beam projected by the reflector is slightly divergent around the axis of the optical system formed by the lamp and reflector, but this divergence with parabolic reflectors is not sufficient to meet certain requirements as to side spread. If the bulb is thrown out of focus, with respect to the parabolic reflector, sufficient side spread may be obtained, but the vertical spread will be too great and other disadvantageous conditions of light distribution will occur.

To increase the side spread, we form on one (and preferably) the inner face of the cover-glass, a series of vertical ribs *d* so shaped as to give a lateral spread to light passing therethrough.

By preference the diffusing ribs form cylindrical ungulas, the cylindrical axes of which $d^x$—$d^x$ are inclined to the opposite face of the glass, or, to express it differently, are, if the glass is flat, inclined to its plane, and are not normal to the optical axis *a*—*a* of the system, whereby light refracted by the ribs is not only diffused laterally but is bent vertically downward to a greater or less extent upon the ground or roadway in front of the vehicle, and not upward into the face of the approaching driver. Furthermore, these ribs are arranged in horizontal tiers or rows, whereby the maximum thickness of the ribs is kept within proper limits. The ribs in one row are staggered in respect to the ribs in the adjacent rows. This staggering is, however, not an essential feature of the invention, but is employed mainly for the sake of pleasing appearance.

This arrangement, if the axes of the ungulas are inclined to the face on which they are placed, as shown in Figs. 1 to 5, breaks the face of the cover-glass into horizontal rows, each row consisting of alternate diffusing faces and plane faces, the latter, marked *e*, being located between the diffusing ribs and being inverted cusps. With this construction the non-diffused light passing through the cover-glass, instead of being a solid beam, is composed of a plurality of rays, the points at which the several rays pass through the cover-glass being separated from each other, so that to some extent the glare due to the non-diffused rays is reduced. The ribs themselves will not produce glare, in that the light issuing therefrom is directed downward.

This construction results in the non-diffusive surfaces of the glass serving to project a beam which serves for the distant illumination of the road, while the downward deflection produced by the ribs, combined with the diffusion caused thereby illuminates a comparatively wide strip immediately in front of the car. This side diffusion is not so much needed in the distant beam, due to the fact that the beam as projected by the reflector is in itself slightly dispersive and therefore at a distance covers a sufficiently wide path.

Figure 5:
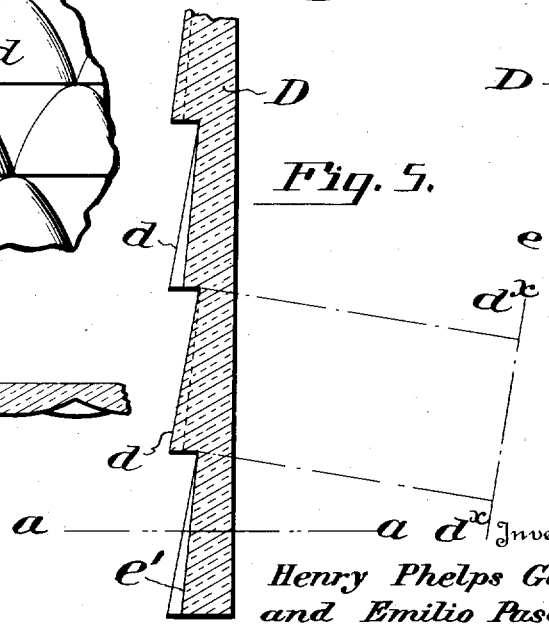
Fig. 5 is a vertical section through a modified form of the glass shown in the above figures.
Figure 3:
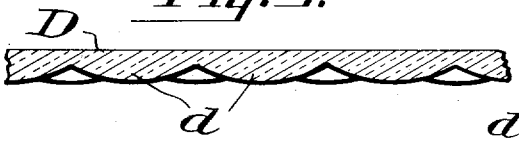
Fig. 3 is a fragmental horizontal section therethrough.

If desired, the cover-glass may have one of its surfaces so shaped as to form a series of prisms whose bases are downward, and a row of ribs may be superimposed on the inclined refracting faces of one or more of these prisms. An example of such construction is shown in Fig. 5, in which the axes of the ungulas *d* are inclined to the refracting faces *e'* of the prisms on which they are placed, although this specific form is not of our invention, it being the invention of another. With such a construction the faces *e'* while non-diffusive, are refracting and serve to project the light passing therethrough downward, but not to the same extent as is done by the ribs.

In the second described cover-glass, (viz., that shown in Figs. 6 to 8), the series of vertical ribs are so arranged upon the glass that no non-refracting portions are left between them through which light projected by the reflector may pass without lateral diffusion, or in other words, the ribs are formed so that they are in contact with each other. By preference, in this form of the invention, the diffusing ribs form cylindrical ungulas, the cylindrical axes of which $d^x$—$d^x$ are parallel to the surfaces in which they are superposed and inclined to the opposite face of the glass. This, in the figures last referred to, is accomplished by forming the cover-glass with a series of substantially horizontal rows of prisms thereon, and superimposing the ribs *d'* on such rows, the cylindrical axis $d^x$—$d^x$ of the ribs being parallel with the refracting prism surfaces $e'$ on which they are placed.

With this construction, all of the light projected by the reflector in a parallel beam will be directed downward, by reason of the prisms and of the inclination of the cylindrical axes of the ribs, and cannot cause glare. The horizontal diffusion produced by the ribs, serves to illuminate a comparatively wide strip of road immediately in front of the car.

Figure 6:
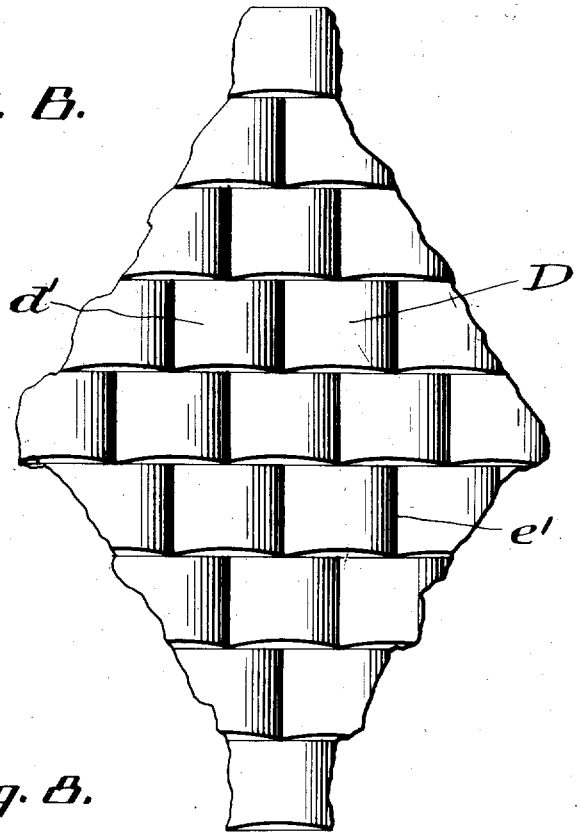
Fig. 6 is a fragmental rear view of the second form of headlight glass forming subject-matter on this invention.
Figure 8:
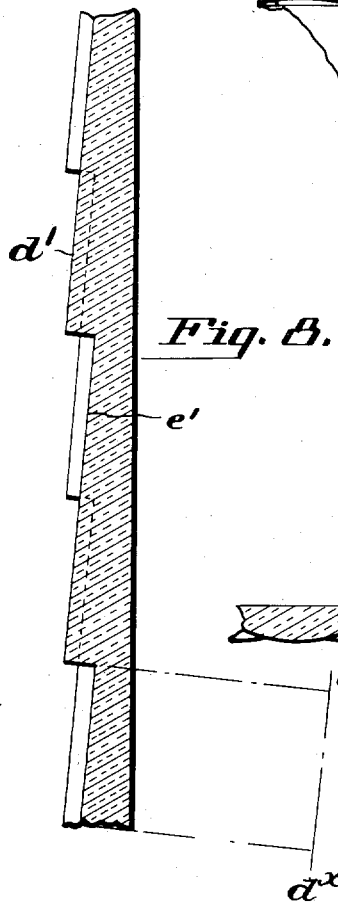
Fig. 8 is a vertical section through the glass shown in Fig. 6.
Figure 7:
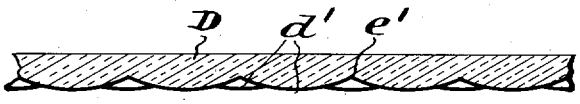
Fig. 7 is a horizontal section through the glass shown in Fig. 6.

It will be noted that in the construction shown in Figs. 1 to 5, the bases of the ungulas are of greater depth than their upper edges, while in Figs. 6 to 8, the ungulas have equal depth at top and bottom; that in Figs. 1 to 4 the downward deflection is due entirely to this peculiarity of the ribs; that in Figs. 6 to 8 the downward deflection is due to the prisms on which the ungulas are superimposed, and that in Fig. 5 it is due to both the ungulas and to the ribs. From this it follows that the character of the projected beam may be widely varied by changing the deflection, due to the several causes, and it will also be understood that the amount of side spread produced by the ribs may be varied by varying the radius on which the surfaces of the ribs are formed; that the downward projection may be varied by varying the angle made by the axes on which the ribs are struck and the opposite side of the cover glass, and that the proportion of the total light projected from the mirror which is diffused may be varied by changing the proportion of the surface of the cover-glass covered by the ribs.

Having thus described our invention, what we claim and desire to secure by Letters Patent is,—

1. A cover-glass for an automobile head-light having on a face thereof a plurality of ribs, the axes of which are inclined to the opposite face of the glass and the faces of which in horizontal cross-section are curved to produce side dispersion, while causing a downward deflection of the rays passing therethrough.

2. A cover-glass having on a face thereof cylindrical ungulas arranged in horizontal rows, the cylindrical axes of the ungulas being inclined to the opposite face of the cover-glass.

3. A flat cover-glass having thereon vertical ribs, whose outer faces in horizontal section are convex and in vertical section are inclined to the plane of the glass to produce downward divergence of the rays passing therethrough when the glass is vertical.

4. A cover for an automobile head-light having on a face thereof a plurality of ribs, the axes of which are inclined to the opposite face of the cover and the faces of which in horizontal cross-section are at an angle to such opposite face to produce side dispersion, while causing a downward deflection of the rays passing therethrough.

5. A cover for an automobile head-light having on a face thereof ungulas arranged in horizontal rows, the axes of the ungulas being inclined to the opposite face of the cover.

6. A flat cover for an automobile head-light having thereon vertical ribs, whose outer faces in horizontal and vertical section are inclined to the plane of the cover to produce downward and side divergence of the rays passing therethrough when the cover is vertical.

In testimony whereof, we have signed our names this 9 day of April, 1918.

HENRY PHELPS GAGE.
EMILIO PASCUCCI.